Figure 1:
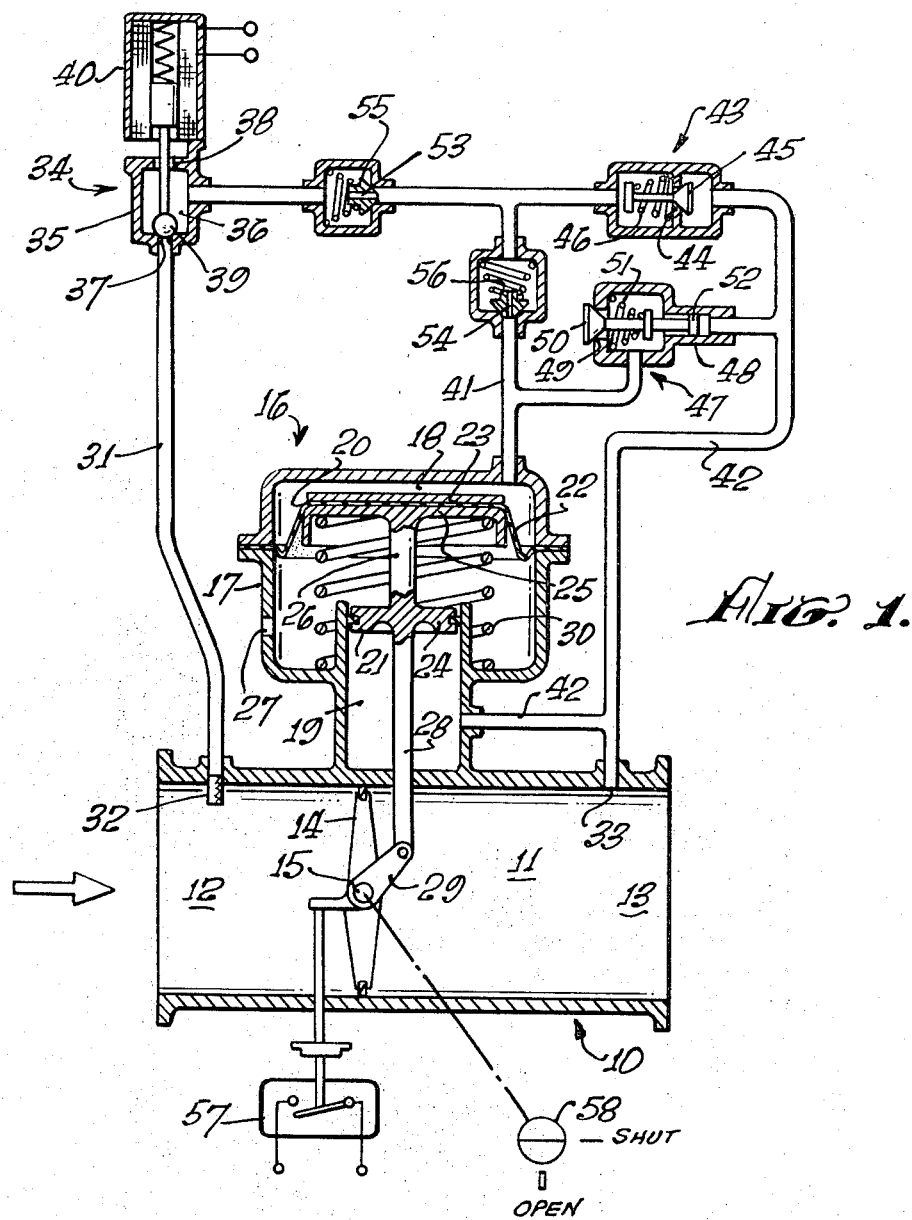

United States Patent [19]
Avant

[11] 3,769,998
[45] Nov. 6, 1973

[54] REGULATOR AND SHUTOFF VALVE
[75] Inventor: William W. Avant, Scottsdale, Ariz.
[73] Assignee: The Garret Corporation, Los Angeles, Calif.
[22] Filed: Oct. 7, 1971
[21] Appl. No.: 187,340

[52] U.S. Cl................ 137/116.5, 137/487, 137/489
[51] Int. Cl......................... F16k 31/12, F16k 31/36
[58] Field of Search.............. 137/488, 489.5, 116.5, 137/492, 489

[56] References Cited
UNITED STATES PATENTS

| | | | |
|---|---|---|---|
| 3,357,443 | 12/1967 | Brumm | 137/116.5 |
| 3,097,664 | 7/1963 | Henley | 137/487 |
| 3,354,901 | 11/1967 | Dietiker et al. | 137/489 X |
| 3,433,251 | 3/1969 | Avant | 137/488 |
| 3,525,355 | 8/1970 | Katchka | 137/489 |

Primary Examiner—Henry T. Klinksiek
Assistant Examiner—Robert J. Miller
Attorney—Albert J. Miller and Jack D. Puffer

[57] ABSTRACT

This valve is employed to control flow of fluid under pressure from a source to apparatus, such as a fluid motor, to effect its operation. The valve regulates the pressure and the application thereof to the using mechanism in such a manner as to prevent initial shock torque. Such result is secured by providing a valve which will initially open slowly by using a relief valve which is reset with downstream pressure for limiting the opening pressure applied to the valve actuator. After the initial opening the pressure is rapidly increased to and maintained in a predetermined range by using a simple reference pressure regulator having downstream pressure trim.

6 Claims, 2 Drawing Figures

PATENTED NOV 6 1973 3,769,998

INVENTOR.
WILLIAM W. AVANT,

By Herschel C. Omohundro
ATTORNEY.

REGULATOR AND SHUTOFF VALVE

BACKGROUND AND SUMMARY OF THE INVENTION

This invention relates generally to valves and is more particularly directed to combination pressure regulating and shutoff valves of the type disclosed in my U.S. Pat. No. 3,433,251, issued Mar. 18, 1969, and the reference cited against it. The objects of the present invention are similar but the manner in which they are attained is characterized by its simplicity, minimum number of parts, positive operation, and minimum requirements of service.

As in my above referenced patent an object of this invention is to provide a valve mechanism which will function to control or regulate the pressure in a fluid supply line so that when the fluid under pressure is to be applied to a mechanism, such as a turbine driven engine starter, the pressure of fluid initially admitted will be low enough to prevent destructive shock from being imparted to the mechanism, then as the mechanism responds, the rate of fluid admission will be progressively increased to effect a smooth rapid acceleration of the mechanism.

More specifically, it is an object of this invention to provide a valve mechanism which will have a main valve with an actuator responsive to differential pressure to effect controlled opening movement and means responsive in part to the pressure downstream of the valve to maintain the differential actuator pressure. The mechanism will also have means for regulating the actuator supply pressure to cause the main valve to maintain regulated system pressure within a desired range.

In addition it is an object of this invention to provide the valve mechanism mentioned in the preceding paragraph with means for initiating and interrupting operation thereof, such means serving to rapidly vent the actuator opening pressure to the ambient atmosphere and permit quick closing of the main valve.

A still further object of the invention is to provide a regulator and shutoff valve mechanism having a main valve disposed in a passage for movement between open and closed positions, a duct extending around the main valve from the upstream to the downstream side thereof, an actuator for the main valve having wall means with areas exposed to chambers communicating with portions of the duct receiving upstream and downstream pressure, a start/stop valve in the duct for actuation between a first position wherein flow through the duct from the upstream side of the main valve will be precluded and the actuator chamber receiving upstream pressure will be vented to ambient pressure and a second position wherein the vent will be closed and pressure from the upstream side of the main valve will be permitted to flow through the duct, a relief regulator disposed in the duct for operation in response to differences in upstream and downstream pressure to maintain a predetermined differential whereby a suitable actuator supply pressure will be provided, and a reference pressure regulator communicating with said duct at the upstream and downstream sides of the relief regulator responds to a predetermined difference in pressure to cause the operation of said main valve to maintain the system pressure within a predetermined range.

It is also an object to provide the duct of the valve mechanism mentioned in the preceding paragraph with orifices and check valves between the actuator supply pressure receiving chamber and the vent to facilitate in the regulation of pressure and rapid closing of the main valve. Other objects and advantages will be made apparent by the following description of a valve constructed in accordance with the invention and illustrated schematically in the accompanying drawing.

THE DRAWING

Figure 2:
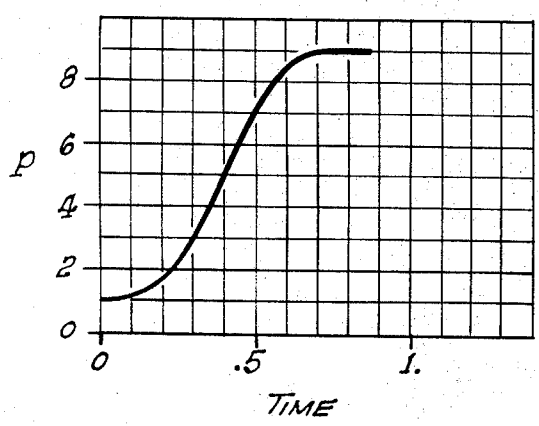

FIG. 1 is a schematic view of a pressure regulator and shutoff valve mechanism embodying the invention; and FIG. 2 is a graph having a curve representing the outlet pressure versus time performance which may be secured with the mechanism shown in FIG. 1.

A valve mechanism constructed according to the invention will include, as shown in FIG. 1, a body 10 forming a passage 11 with inlet and outlet ends 12 and 13, respectively. A main valve element 14 of butterfly type is supported for pivotal movement at 15 between closed and open positions. The mechanism is also provided with an actuator, designated generally by the numeral 16, having a casing 17, integrally or otherwise suitably formed with the body 10. Casing 17 provides chambers 18 and 19 for receiving and applying fluid pressure to wall surfaces 20 and 21 to exert opening and closing forces on the main valve element 14. Wall surface 20 is provided by diaphragm and clamp plate members 22 and 23 while wall surface 21 is formed by one side of a piston 24 connected with a diaphragm clamp and spring abutment plate 25 as at 26. The diaphragm is peripherally clamped by portions of casing 17 and forms in association with plate 23, a movable wall for chamber 18 to one side of which opening pressure is applied. The other side of the diaphragm and plate member 25 are exposed to ambient pressure through opening 27. Movement of the diaphragm and piston assembly is transmitted to the main valve 14 by a piston rod 28 and lever 29. A spring 30 disposed between abutment plate 25 and a wall of the casing 17 yieldably opposes movement of the diaphragm, piston and valve assembly by fluid pressure introduced into the chamber 18. When such pressure is below a predetermined value, spring 30 will hold main valve 14 in the closed position in which it is shown in FIG. 1.

The mechanism is provided with a duct 31 communicating at its ends 32 and 33 with the passage 11 at the upstream and downstream sides, respectively, of the main valve 14. Duct 31 has a start/stop valve 34 incorporated therein to initiate and interrupt the operation of the mechanism. Start/stop valve 34 has a casing 35 with a chamber 36 opening to a portion of the duct leading to the inlet side of the valve body through a seat 37. Casing 35 has another seat 38 surrounding an outlet to the ambient atmosphere. A ball valve 39 is disposed in the chamber 36 to alternately engage the seats 37 and 38 in response to the application and interruption, respectively, of current to a solenoid 40 at one end of casing 35. Chamber 36 also communicates with the portion of the duct leading to the outlet end of the passage 11.

Duct 31 communicates with chamber 18 of the actuator through a branch 41 and with piston chamber 19 through another branch 42. Between the points of connection of duct 31 with branch 41 and the outlet end of passage 11, the duct is equipped with a relief regulator valve 43. This element is an inline device receiving fluid under pressure from the inlet end of passage 11 and discharging at least a part of such fluid to the passage 11 downstream of the main valve 14. Relief regulator 43 has a casing with an internal seat 44 for engagement by a poppet 45 to control flow through the duct 31. Poppet 45 is urged toward seat 44 by a spring 46 disposed between a head on the poppet stem and part of the casing. Inlet pressure from passage 11 tends to move poppet 45 away from seat 44, such movement being opposed by spring 46. The force of such spring is predetermined to permit the poppet to start to open when inlet pressure reaches a certain value in excess of the pressure at the downstream side of the main valve or outlet end of passage 11. This pressure is effective over a downstream area of poppet 45 equal to the area of seat 44 to assist spring 46 in closing the poppet. The relief regulator is thus responsive to a predetermined differential in pressure between the inlet and outlet ends of passage 11 to pass fluid from the upstream to the downstream ends of the duct and maintain a prearranged actuator supply pressure. Such pressure admitted to chamber 18 is effective over surface 20 to move the diaphragm, piston and main valve assembly toward a passage opening position. Such movement is resisted by the force of spring 30 and fluid pressure downstream of the main valve admitted to piston chamber 19 through branch passage 42.

To establish and maintain a regulated pressure within a selected range, the mechanism is provided with a reference pressure regulator device 47 which is connected between the branch 41 and the duct 31 at the outlet side of the relief regulator 43. The reference regulator 47 has a body 48 forming a chamber communicating with branch 41, to receive actuator supply pressure, and an outlet 49 leading to the ambient atmosphere. A poppet 50 engages a seat surrounding outlet 49 to control flow from the duct 31 upstream of relief regulator 43 to the ambient atmosphere to govern the operation of the actuator in maintaining the regulated pressure downstream of the main valve. To oppose movement of poppet 50 by actuator supply pressure, a spring 51 engages body 48 and a shoulder on the poppet stem. The poppet has a piston with a carefully calculated area 52 exposed to the pressure at the downstream side of the main valve. In the mechanism selected for illustration the area 52 bears a predetermined relation to the area of the outlet 49, for example 1/2. The force of the actuator supply pressure over the area of the outlet minus the area of the piston added to the force of the downstream pressure over the area of the piston less the force of the spring 51 tends to move the poppet open to vent pressure. When the actuator supply pressure starts to exceed a predetermined value, poppet 50 will start to open to limit the actuator supply pressure increase. Through the proper calculation of areas and selection of spring forces, the correct operation of the actuator to maintain regulated pressure within a predetermined range will be secured.

Control of pressures and operation can be more easily secured by using an orifice 53 in duct 31 between branch 41 and the start/stop valve 34 and another orifice 54 in branch passage 41 and duct 31 at the inlet side of the relief regulator 43. These orifices limit the rate of flow of fluid through the ducts. For convenience they are formed in check valve elements 55 and 56 which are yieldably urged in a closed direction but respond to a pressure differential when ball 39 is moved to open position, to rapidly vent chamber 18. At this time spring 30 and regulated pressure downstream of main valve 14 will quickly move the actuator to a valve closing position.

Suitable switch means 57 may be employed to indicate when the valve is open or closed. Also additional indicating means 58 will show the position of the butterfly 14.

From the foregoing it will be apparent that the operation of the mechanism is substantially as follows: Assuming the inlet 12 is connected with a suitable source of fluid pressure and the outlet is connected with a device or system utilizing such fluid, electric power is directed to solenoid 40 to energize the same. Ball 39 will be moved from seat 37 to seat 38. This action will permit fluid under pressure from passage 11 at the upstream side of valve 14 to flow into chamber 36 and the portion of duct 31 leading therefrom. Fluid will flow through orifices 53 and 54 into chamber 18 and will also flow into the relief regulator and be applied to poppet 45. If the pressure of the fluid is sufficient to overcome spring 46 poppet will crack slightly and permit fluid to pass to the portion of duct 31 leading to the outlet end of passage 11. Fluid under pressure accumulating in chamber 18 will be effective over the area of wall surface 20 to urge the actuator in a valve opening direction. As main valve 14 starts to open, fluid will flow to the downstream side and pressure in the outlet end of the passage will start to increase. This increasing pressure will be applied to poppet 45 to tend to close the same and pressure at the inlet side thereof will increase, the actuator supply pressure thus building up and tending to further increase the opening of the main valve. It will be apparent that the application of pressure from the downstream side of the main valve 14 to the poppet 45 of the relief regulator will make this element maintain a selected actuator supply pressure which is a predetermined differential over the pressure downstream of the main valve. The orifice 54 restricts the flow of actuator supply pressure to the chamber 18 causing the actuator to open valve 14 at the desired rate. As shown in FIG. 2 the initial opening of the valve will be relatively slow then the rate of opening will rapidly increase until the regulated pressure approaches the desired range. Downstream pressure then acting on the piston of the reference regulator poppet will begin to open the poppet to vent the actuator supply pressure permitting the spring 30 and regulated downstream pressure applied to piston 24 to move valve 14 toward closed position. The reference pressure regulator is thus trimmed by downstream pressure to control regulated pressure within the desired range.

To stop the operation of the valve mechanism, the solenoid 40 is de-energized. At this time ball 39 will move from seat 38 to seat 37 and further flow of fluid pressure from passage 11 through duct 31 will be prevented. When vent 38 is opened, fluid pressure in chamber 18 will be rapidly dissipated through check valves 54 and 55 to the ambient atmosphere. Actuator 16 will quickly move the main valve 14 to closed position and the mechanism will then be in condition for the next operation.

While the invention has only been schematically illustrated it is obvious that the principles may be incorporated in mechanical structures of many designs without departing from the spirit and scope of the following claims.

I claim:

1. A pressure regulating and shutoff valve, comprising:
   a. means forming a fluid flow passage;
   b. a main valve means disposed in said passage for movement between open and closed positions to control fluid flow through the passage;
   c. fluid pressure responsive actuator means connected with said main valve means to effect the operation thereof;
   d. a first means for applying fluid pressure from a source upstream of said main valve means to said actuator means to effect the operation of said valve means;
   e. a second means for regulating the pressure of fluid applied to said actuator means, said second means having relief valve means with an inlet communicating with said source and said actuator means and an outlet communicating with the downstream side of said main valve, said relief valve means being responsive to pressure downstream of said main valve to restrict the pressure from said source applied to said actuator to a predetermined value in excess of such downstream pressure; and
   f. a selectively actuated valve to alternately connect the inlet of said actuator and relief valve means with said fluid pressure source and the ambient atmosphere.

2. A pressure regulating and shutoff valve, comprising:
   a. means forming a fluid flow passage;
   b. a main valve means disposed in said passage for movement between open and closed positions to control fluid flow through the passage;
   c. fluid pressure responsive actuator means connected with said main valve means to effect the operation thereof;
   d. means for applying fluid pressure from a source upstream of said main valve means to said actuator means to effect the operation of said valve means;
   e. relief valve means with an inlet communicating with said source and said actuator means and an outlet communicating with the downstream side of said main valve, said relief valve means being responsive to pressure downstream of said main valve to restrict the pressure applied to said actuator to a predetermined value in excess of such downstream pressure;
   f. a selectively actuated valve to alternately connect the inlet of said actuator and relief valve means with said fluid pressure source and the ambient atmosphere; and
   g. a check valve disposed downstream of said selectively actuated valve and upstream of said actuator and said relief valve means, said check valve having an orifice to limit fluid flow from said source to said relief valve means and actuator and a part which is movable when said selectively actuated valve connects said check valve with the ambient atmosphere to permit substantially unrestricted flow from said actuator to the ambient atmosphere.

3. A pressure regulating and shutoff valve according to claim 2 in which a second check valve is disposed between said relief valve means and said actuator, said second check valve having an orifice to limit fluid flow from said source to said actuator and being movable to permit substantially unrestricted flow from said actuator to the ambient atmosphere when said selectively actuated valve connects said check valve with the ambient atmosphere.

4. A pressure regulating and shutoff valve, comprising:
   a. means forming a fluid flow passage;
   b. a main valve means disposed in said passage for movement between open and closed positions to control fluid flow through the passage;
   c. fluid pressure responsive actuator means connected with said main valve means to effect the operation thereof;
   d. a first means for applying fluid pressure from a source upstream of said main valve means to said actuator means to effect the operation of said valve means; and
   e. a second means for regulating the pressure of fluid applied to said actuator means, said second means having relief valve means with an inlet communicating with said source and said actuator means and an outlet communicating with the downstream side of said main valve, said relief valve means being responsive to pressure downstream of said main valve to restrict the pressure from said source applied to said actuator to a predetermined value in excess of such downstream pressure, said relief valve means having a valve element biased toward open position by pressure from said source and toward closed position by the combination of pressure downstream of said main valve and a resilient means exerting a predetermined force; and
   f. a reference regulator valve means having an inlet communicating with the inlet of said relief valve means and with the inlet of said actuator, an outlet communicating with the ambient atmosphere, and a valve element for controlling communication between the inlet and outlet of said referenced regulator valve means, said valve element being exposed to actuator supply pressure and pressure downstream of said main valve and responsive to a predetermined increase in actuator supply pressure to establish communication between the reference regulator valve inlet and outlet.

5. A pressure regulating and shutoff valve comprising:
   a. means forming a fluid flow passage;
   b. a main valve means disposed in said passage for movement between open and closed positions to control fluid flow through the passage;
   c. a duct communicating at its ends with said fluid flow passage at the upstream and downstream sides of said main valve;
   d. actuator means connected with said main valve means to effect operation thereof, said actuator means having movable wall means exposed to pressure fluid receiving chambers to cause opening and closing movement of said main valve means;
   e. relief valve means disposed in said duct and having an element responsive to a pressure differential between the upstream and downstream sides thereof to establish flow through said duct, the fluid chamber of said actuator means which receives main valve opening pressure communicating with the duct at the upstream side of said relief valve means and the fluid chamber of said actuator means which receives main valve closing pressure communicating with the duct at the downstream side of said relief valve means;

f. a start/stop valve in said duct selectively operative to establish fluid flow from said passage therethrough or interrupt such flow and connect the duct at the upstream side of said relief valve with the ambient atmosphere;

g. check valve means between said actuator and said start/stop valve operative to restrict flow toward said actuator and provide substantially unrestricted flow in the opposite direction; and h. reference regulator valve means communicating with said duct at the upstream and downstream sides of said relief valve means, said reference regulator valve means having an outlet to the ambient atmosphere and a poppet element exposed to main valve opening pressure and pressure downstream of said main valve, said poppet element being responsive to a predetermined increase in main valve opening pressure to vent a part of such pressure to the ambient atmosphere and maintain the pressure within a predetermined range.

6. A pressure regulating and shutoff valve comprising:

a. means forming a fluid flow passage;

b. a main valve means disposed in said passage for movement between open and closed positions to control fluid flow through said passage;

c. fluid pressure responsive actuator means connected with said main valve means to effect the operation thereof, d. a first means for applying fluid pressure from a source to said actuator means to effect the operation of said valve means;

e. a second means for regulating the pressure of fluid applied to said actuator means, said second means having relief valve means with an inlet communicating with said source and said actuator means and an outlet communicating with the downstream side of said main valve, said relief valve means being responsive to pressure downstream of said main valve to restrict the pressure from said source applied to said actuator to a predetermined value in excess of such downstream pressure;

f. wall means dividing said actuator means into two chambers, one side of said wall means being exposed to pressure downstream of said main valve to oppose movement of said main valve toward the open position and the other side of said wall means being exposed to pressure as regulated by said relief valve means to move said main valve toward the open position, the portion of said wall exposed to pressure downstream of said main valve being of a smaller area than the area exposed to the pressure regulated by the relief valve; and g. resilient means connected to said actuator means to supplement the pressure downstream of said main valve in opposing movement of said main valve toward the open position.

* * * * *